United States Patent [19]
Gantt

[11] Patent Number: 5,675,809
[45] Date of Patent: Oct. 7, 1997

[54] VOLTAGE CONTROL CIRCUIT FOR A DUAL VOLTAGE BUS COMPUTER SYSTEM

[75] Inventor: Charles H. Gantt, West Columbia, S.C.

[73] Assignee: NCR Corporation, Dayton, Ohio

[21] Appl. No.: 386,831

[22] Filed: Feb. 10, 1995

[51] Int. Cl.⁶ .................... G06F 1/26; G06F 1/30
[52] U.S. Cl. .................... 395/750; 307/147; 395/308
[58] Field of Search .................... 395/750, 306, 395/280, 283, 308; 326/57, 68, 81, 86; 307/42, 43, 147; 365/185.18

[56] References Cited

U.S. PATENT DOCUMENTS

| | | | |
|---|---|---|---|
| 4,477,741 | 10/1984 | Moser, Jr. | 307/473 |
| 4,567,388 | 1/1986 | Jarrett et al. | 307/540 |
| 4,574,266 | 3/1986 | Valentine | 340/52 F |
| 5,047,663 | 9/1991 | Lee et al. | 307/296.1 |
| 5,053,920 | 10/1991 | Staffiere et al. | 361/383 |
| 5,157,269 | 10/1992 | Jordan et al. | 307/59 |
| 5,239,216 | 8/1993 | Sei et al. | 307/549 |
| 5,260,904 | 11/1993 | Miyawaki et al. | 365/189.06 |
| 5,266,849 | 11/1993 | Kitahara et al. | 307/475 |
| 5,315,179 | 5/1994 | Pelley, III et al. | 307/475 |
| 5,321,319 | 6/1994 | Mahmood | 307/443 |
| 5,347,177 | 9/1994 | Lipp | 326/30 |
| 5,397,941 | 3/1995 | Merrill | 326/68 |
| 5,421,734 | 6/1995 | MacWilliams | 439/59 |
| 5,422,523 | 6/1995 | Roberts et al. | 326/68 |
| 5,442,307 | 8/1995 | Shigehara et al. | 326/81 |
| 5,444,397 | 8/1995 | Wong et al. | 326/81 |
| 5,469,082 | 11/1995 | Bullinger et al. | 326/81 |
| 5,497,037 | 3/1996 | Lee et al. | 307/42 |
| 5,515,225 | 5/1996 | Gens et al. | 361/56 |
| 5,534,801 | 7/1996 | Wu et al. | 327/72 |

*Primary Examiner*—Gopal C. Ray
*Attorney, Agent, or Firm*—Paul W. Martin

[57] ABSTRACT

A voltage control circuit for a dual voltage bus computer system which reduces the voltage on the first bus during a short circuit on the second bus or removal of power from the second bus so that the instantaneous voltage on the first bus does not exceed the instantaneous voltage on the second bus. The voltage control circuit includes a voltage reducing circuit, including a comparison circuit coupled to the first and second buses, a switch controlled by the comparison circuit for drawing current from the first bus, and a voltage gap determining circuit coupled between the second bus and the comparison circuit which provides a reference voltage to the comparison circuit that is a predetermined fraction of the instantaneous voltage on the second bus. The voltage control circuit may also include a bias circuit coupled to the first bus and a voltage maintenance circuit which maintains operation of the bias circuit for a predetermined time after a removal of power from the first bus in the case of a normal power down of both buses.

31 Claims, 5 Drawing Sheets

FIG. 1

FIG. 2A
CLAMP A

FIG. 2B
CLAMP B

VOLTAGE CONTROL CIRCUIT FOR A DUAL VOLTAGE BUS COMPUTER SYSTEM

BACKGROUND OF THE INVENTION

The present invention relates to electronic circuits requiring two buses of different operating voltages, and more specifically to a voltage control circuit for a dual voltage bus computer system.

Traditional computer systems have been designed around a single voltage. A typical voltage for Intel-based processor computer systems today is either 5 volts or 3.3 volts.

Recently, however, computer systems having multiple buses operating at different voltages have been introduced into the marketplace. For example, recent Intel-based processor computer systems may include 5-volts and 3.3-volt buses. Such systems may result when newer 3.3-volt processors are inserted into 5-volts systems using a voltage conversion circuit.

Some components which are connected to both of these buses may suffer damage if the voltage on the 3.3-volt bus exceeds the voltage on the 5-volts bus during a normal power down or an abnormal short circuit on the 5-volts bus.

Therefore, it would be desirable to provide a voltage control circuit for a dual voltage bus system which maintains the voltage on the first bus below the voltage on the second bus.

SUMMARY OF THE INVENTION

In accordance with the teachings of the present invention, a voltage control circuit for a dual voltage bus computer system is provided. The voltage control circuit reduces the voltage on the first bus during a short circuit on the second bus or removal of power from the second bus so that the instantaneous voltage on the first bus does not exceed the instantaneous voltage on the second bus. Removal of power from the second bus may occur by itself in connection with a failure, or it may occur as part of a normal power down of the computer.

The voltage control circuit includes a voltage reducing circuit, including a comparison circuit coupled to the first and second buses, a switch controlled by the comparison circuit for drawing current from the first bus, and a voltage gap determining circuit coupled between the second bus and the comparison circuit which provides a reference voltage to the comparison circuit that is a predetermined fraction of the instantaneous voltage on the second bus.

The voltage control circuit may also include a bias circuit coupled to the first bus and a voltage maintenance circuit which maintains operation of the bias circuit for a predetermined time after a removal of power from the first bus in the case of a normal power down of both buses.

It is accordingly an object of the present invention to provide a voltage control circuit for a dual voltage bus computer system.

It is another object of the present invention to provide a voltage control circuit for a dual voltage bus computer system which reduces the voltage on the first bus during a short circuit on the second bus or removal of power from the second bus so that the instantaneous voltage on the first bus does not exceed the instantaneous voltage on the second bus.

It is another object of the present invention to provide a voltage control circuit for a dual voltage bus computer system which includes a bias circuit and a voltage maintenance circuit which maintains operation of the bias circuit for a predetermined time after a removal of power from the first bus during an abnormal short circuit on the first bus and during a normal power down of the computer system.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
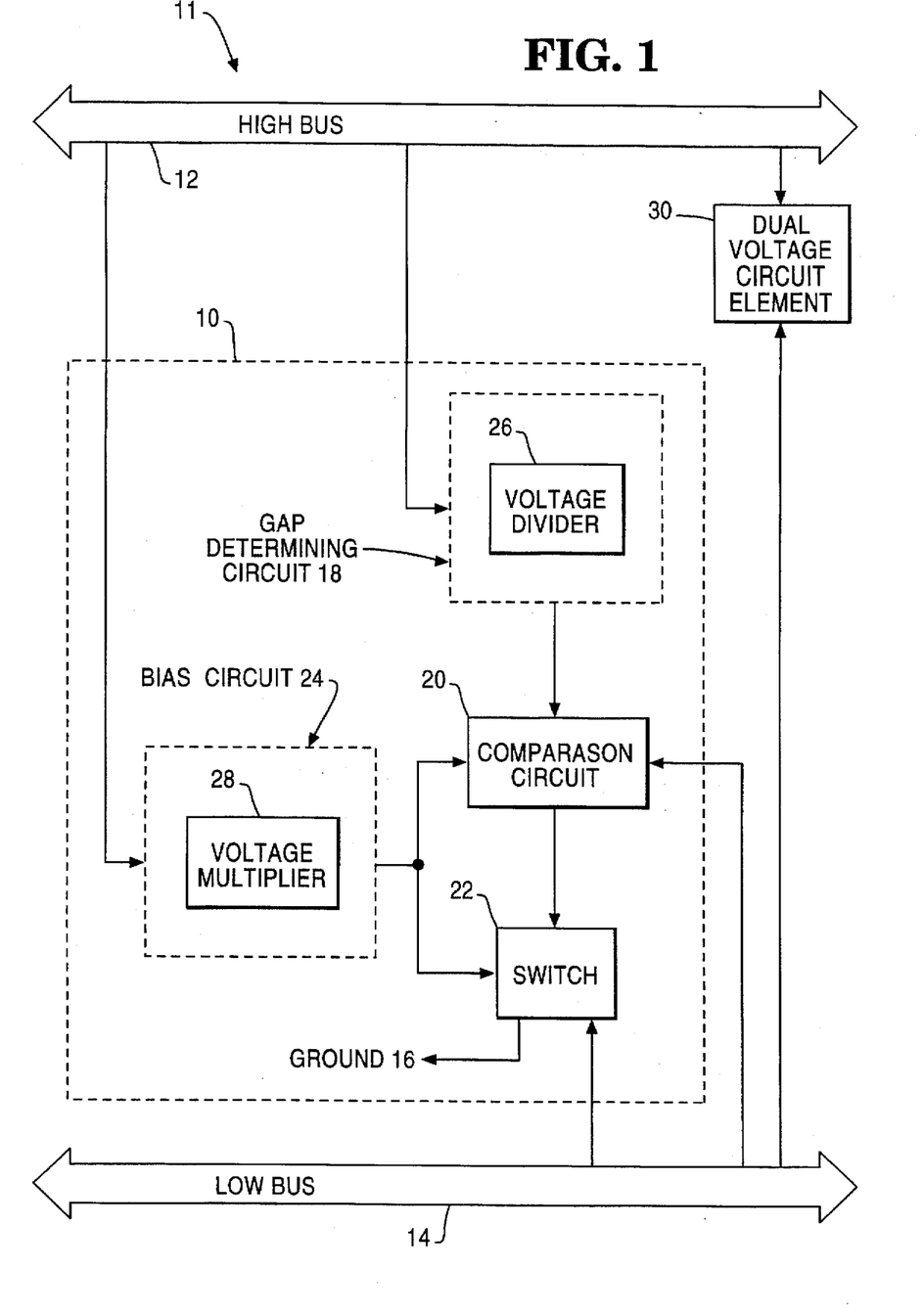
FIG. 1 is a block diagram of the voltage control circuit of the present invention.

Referring now to FIG. 1, voltage control circuit 10 within computer system 11 includes gap determining circuit 18, comparison circuit 20, switch 22, and bias circuit 24. Voltage control circuit 10 is shown in conjunction with high bus 12, low bus 14, ground 16, and dual-voltage circuit 30.

For Intel-based processor computers having dual voltage buses, high bus is preferably a 5-volts bus and low bus 14 is preferably a 3.3-volt bus. Circuit 10 of the present invention reduces the voltage on the 3.3-volt bus during a short circuit on the 5-volts bus or removal of power from the 5-volts bus so that the instantaneous voltage on the 3.3-volt bus does not exceed the instantaneous voltage on the 5-volts bus. Removal of power from the 5-volts bus may occur by itself in connection with a failure, or it may occur as part of a normal power down of the computer.

Dual-voltage circuit 30 is any circuit that requires both voltages to operate and that would be damaged by the voltage on low bus 14 exceeding the voltage on high bus 12 due to a normal power down of buses 12 and 14 or short circuit on high bus 12. One example would be an ASIC manufactured by LSI. That ASIC has parasitic diodes which would be damaged by a forward bias if the scenario above were to occur.

Gap determining circuit 18 is coupled to high bus 12 and provides a reference voltage to comparison circuit 20. Preferably, gap determining circuit 18 includes voltage divider 26. Gap determining circuit 18 provides a voltage difference between low bus 14 and high bus 12 during a normal power down or abnormal short circuit condition on high bus 12 and allows switch 22 to operate.

Comparison circuit 20 compares the voltage from high bus 12 through voltage divider 26 with the voltage from low bus 12 and provides a signal to switch 22 to reduce the voltage on low bus 14 to remain below the voltage on high bus 12 if the voltage on high bus 12 decreases. During normal system power down or short circuit on high bus 12, low bus 14 provides a dynamic voltage reference to comparison circuit 20.

Switch 22 decreases the voltage on low bus 14 in accordance with the signal from comparison circuit 20 by increasing the current between low bus 14 and ground 16.

Bias circuit 24 provides a bias voltage for comparison circuit 20 and switch 22. Preferably, bias circuit 24 includes voltage multiplier 28 to obtain the desired response time from switch 22.

Figure 2A:
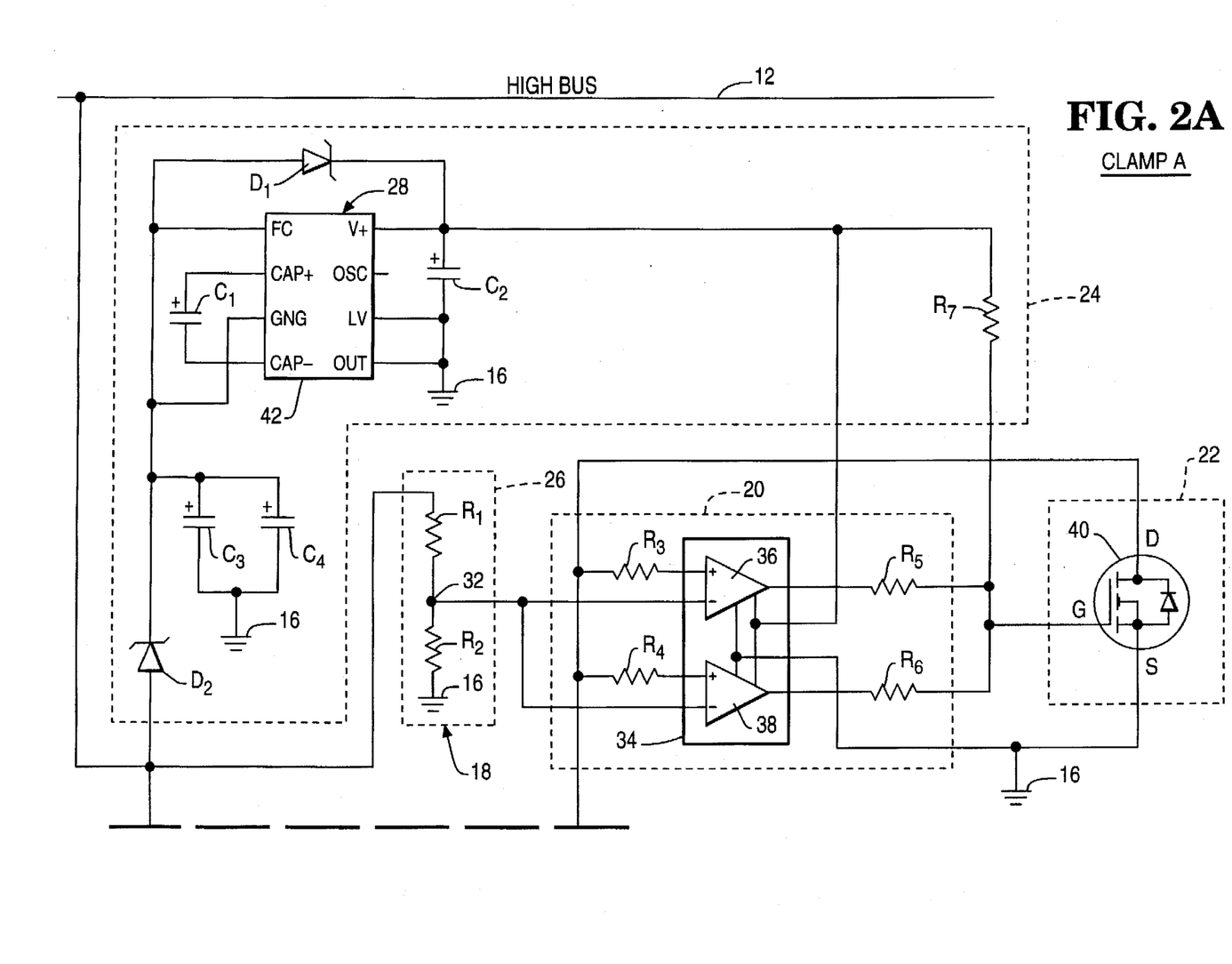
FIGS. 2A and 2B form a detailed schematic of the voltage control circuit of FIG. 1.
Figure 2B:
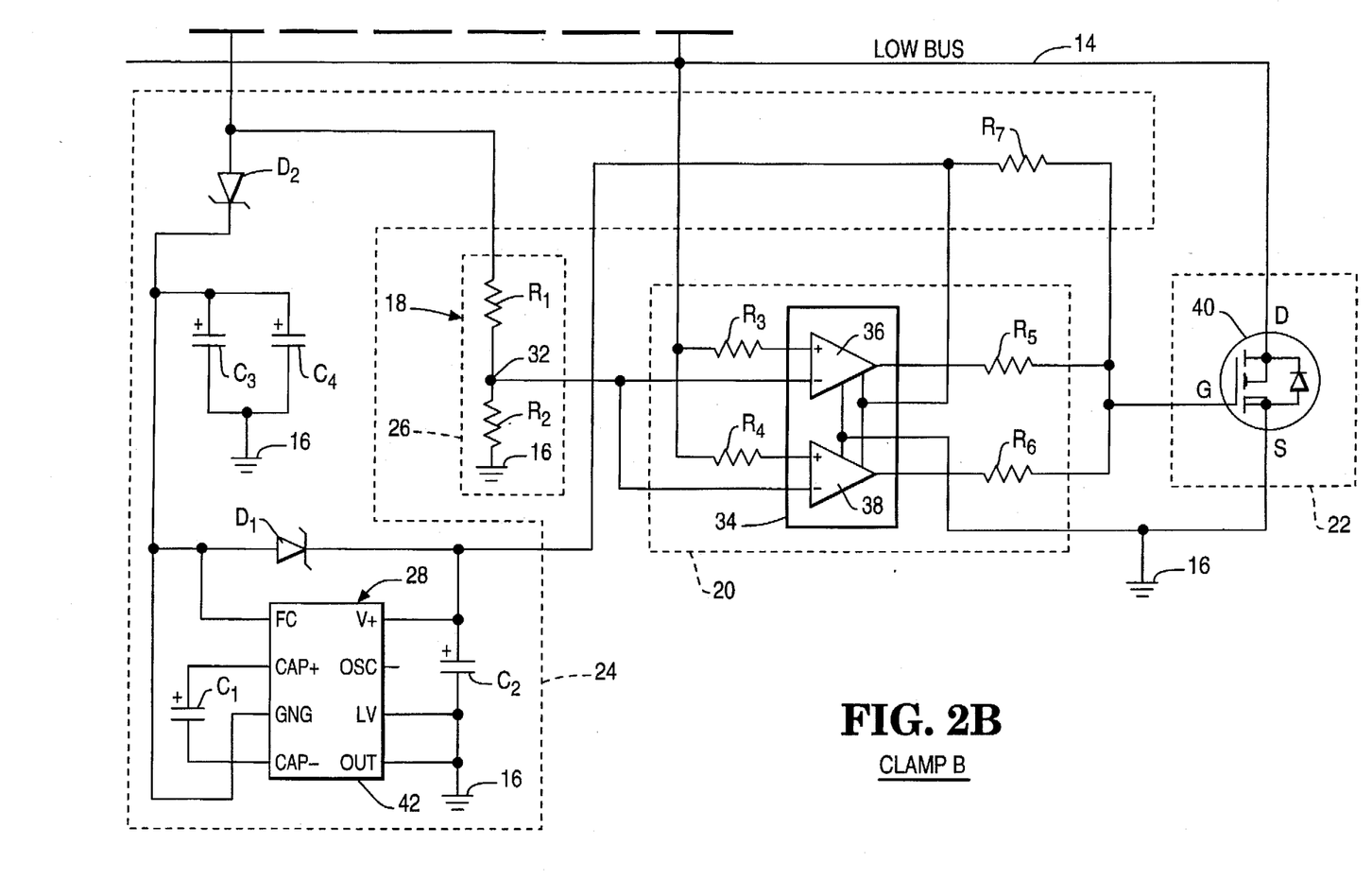

Referring now to FIGS. 2A and 2B, two identical voltage control circuits 10 and 11 operate in parallel to ensure that the desired response occurs.

In more detail, voltage divider 26 includes resisters R1 and R2 arranged in series between high bus 12 and ground 16. A tap point 32 between the resistors provides a gap producing voltage to comparison circuit 20. The tap point voltage is less than the voltage on high bus 12 and decreases as the voltage on high bus 12 decreases to ensure a safe voltage separation between buses 12 and 14 during a normal power down or an abnormal short circuit condition on high bus 12.

Comparison circuit 20 includes element 34 and resistors R3–R6. Element 34 is preferably manufactured by National Semiconductor and has a model number of LM393. It includes two comparators 36 and 38 for added redundancy, each receiving a first input from tap point 32 and a second input from low bus 14 through resistors R3 and R4. Resistors R3 and R4 provide an impedance equivalent to the impedance provided by voltage divider 26. Comparators 36 and 38 provide output signals through resistors R5 and R6 to drive switch 22 to conduct when the voltage on high bus 12 falls below the reference voltage at tap point 34. Resistors R5 and R6 protect comparison circuit 20 by limiting capacitive current from switch. The ends of resistors R5 and R6 are joined before coupling to switch 22.

Switch 22 conducts current between low bus 14 and ground 16 in response to the output signal from comparison circuit 20. Switch 22 is preferably a metal-oxide semiconductor field effect transistor (MOSFET) 40 manufactured by International Rectifier and having a model number of IRFZ40. The gate G couples to the output of comparison circuit 20, the source S couples to ground 16, and the drain D couples to low bus 14.

Voltage multiplier 28 of bias circuit 24 preferably includes element 42 which is a 2X voltage multiplier manufactured by Maximum and has a model number of MAX660. A 2X voltage multiplier is sufficient for obtaining the required response when driving the gate G of MOSFET 40.

Bias circuit 24 further includes diode D1 and D2, resistor R7, and capacitors C1–C4. Resistor R7 is a pull up resistor for increasing the voltage at gate G to cause saturation.

Capacitors C3 and C4 for a bias maintenance circuit which maintains the bias current as voltage on high bus 12 falls. There is enough margin in the bias maintenance circuit to keep bias circuit 24 active until power down is complete. In the example of FIGS. 2A and 2B, bias circuit 24 remains operational for approximately 1000 ms, which is much greater than the normal power down time of 450 ms.

Preferred values for the elements of FIGS. 2A and B are shown below in Table I:

TABLE I

| Element | Value |
| --- | --- |
| R1 | 1.3kΩ |
| R2 | 5.11kΩ |
| R3 | 1.00KΩ |
| R4 | 1.00KΩ |
| R5 | 49.9Ω |
| R6 | 49.9Ω |
| R7 | 2.0kΩ |
| C1 | 180 µf |
| C2 | 180 µf |
| C3 | 180 µf |
| C4 | .1 µf |

Figure 3:
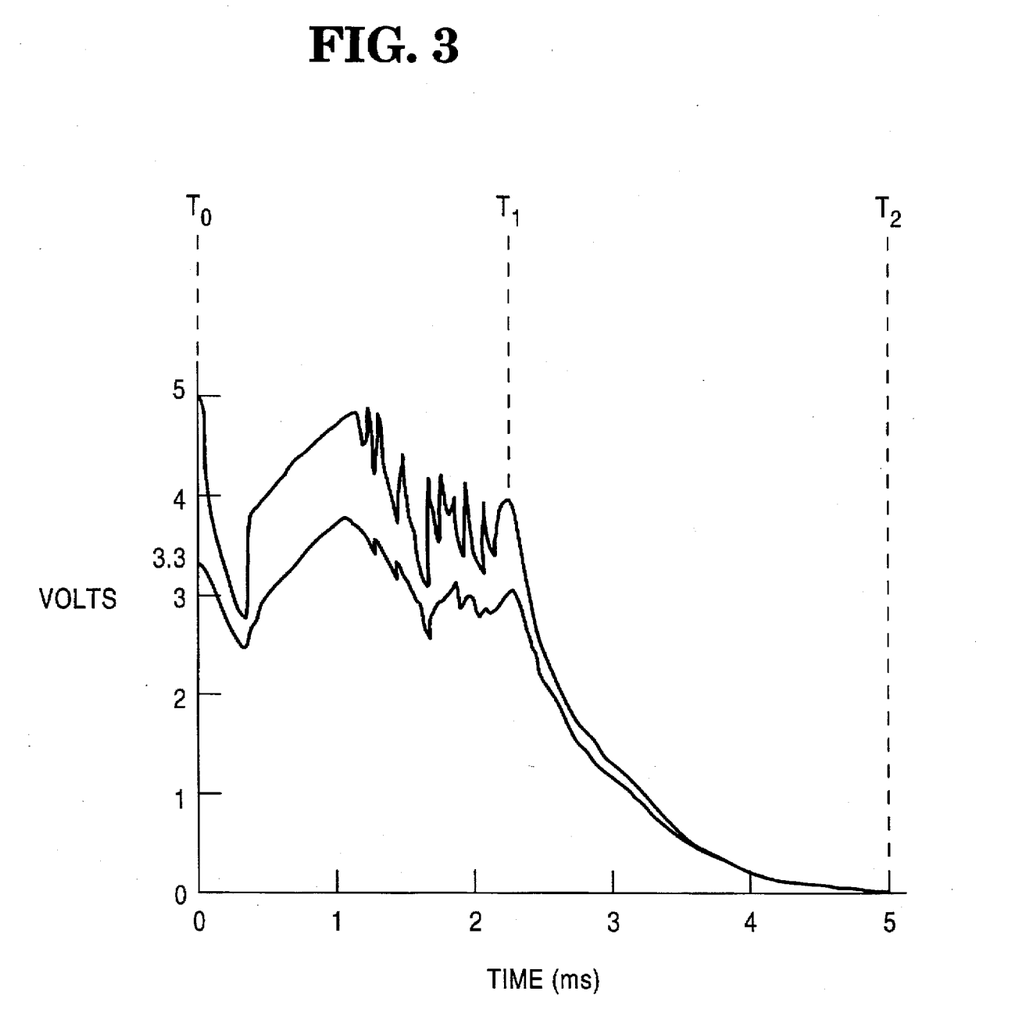
FIG. 3 is a graph illustrating the operation of the circuit of FIG. 2 during a short circuit condition.

Turning now to FIG. 3, operation of circuit 10 is illustrated in more detail. FIG. 3 illustrates the behavior of the voltages on the high and low buses 12 and 14 over time when a short circuit exists on high bus 12. A fault condition is reflected here as a brief fluctuation in the voltage on high bus 12 after short circuit time toe. From time t1, voltages on both buses 12 and 14 decrease rapidly and approach zero volts at time t2. The voltage on high bus 12 remains above the voltage on low bus 14 from time t0 to t2, even throughout the voltage fluctuations. In the illustrated example, the time duration from time t0 to time t2 is about five milliseconds.

The time duration under short circuit conditions can be changed by adjusting circuit values. The primary goal is protect expensive circuit elements between high and low buses 12 and 14. By way of example, this illustration was designed to decrease voltage as quickly as possible to prevent damage to the expensive LSI ASIC mentioned above. However, in some circuits, the resulting high current may damage less expensive components, such as tantalum caps. The circuit values above minimize the chance of damaging both the LSI ASIC and the tantalum caps.

Figure 4:
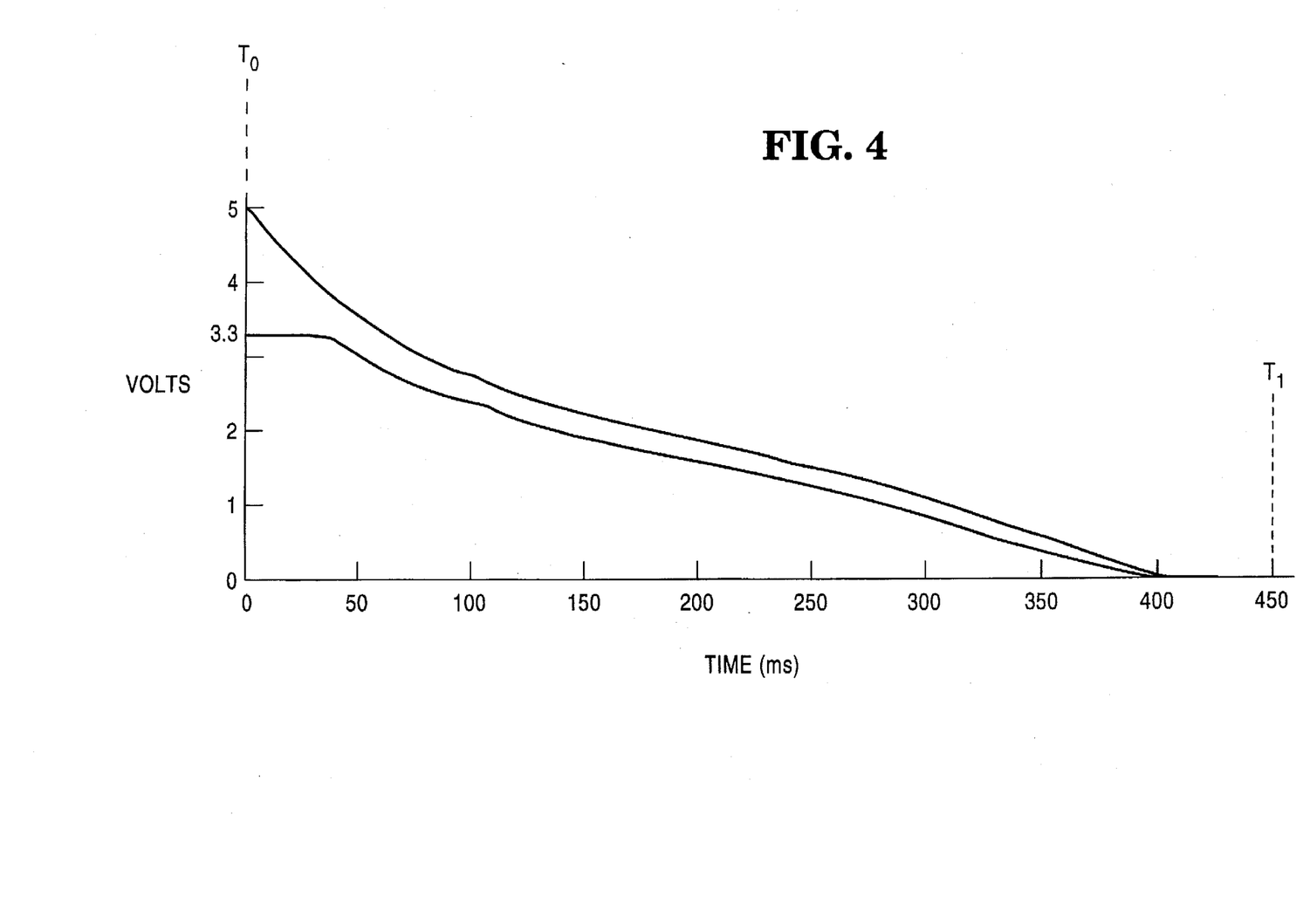
FIG. 4 is a graph illustrating the operation of the circuit of FIG. 2 during a normal power down.

FIG. 4 illustrates the behavior of the voltages on the high and low buses 12 and 14 over time when the power switch is opened during a normal power off sequence. Voltages on both buses 12 and 14 decrease gradually, starting from power off time t0. Less expensive components are less likely to be stressed in the normal power down scenario. The voltage on high bus 12 remains above the voltage on low bus 14 throughout the decrease. The voltage on buses 12 and 14 taper off to zero volts at time t1, which is about 450 ms.

In both FIGS. 3 and 4, gap determining circuit 18 provides a voltage gap between 1.7 and zero volts. Thus, the voltage control circuit of the present invention reduces the risk of damage to electronic components connected between the two buses.

Although the invention has been described with particular reference to certain preferred embodiments thereof, variations and modifications of the present invention can be effected within the spirit and scope of the following claims.

I claim:

1. A computer system comprising:

a circuit element powered by both a first steady state voltage and a second steady state voltage different from the first steady state voltage;

a first bus coupled to the circuit element which provides the first steady state voltage;

a second bus coupled to the circuit element which provides the second steady state voltage; and a voltage control circuit coupled to the first and second buses which prevents damage to the circuit element by preventing an instantaneous voltage on the first bus from exceeding another instantaneous voltage on the second bus during power removal from the computer system and during a short circuit on the second bus, wherein the voltage control circuit includes a comparison circuit coupled to the first and second buses which compares the instantaneous voltage on the first bus with the instantaneous voltage on the second bus, and a switch controlled by the comparison circuit for drawing current from the first bus to reduce the voltage on the first bus to remain below the voltage on the second bus when the voltage on second bus decreases.

2. The computer system as recited in claim 1, wherein the voltage control circuit further comprises:

a voltage gap determining circuit coupled between the second bus and the comparison circuit which provides a reference voltage to the comparison circuit that is a predetermined fraction of the instantaneous voltage on the second bus.

3. The computer system as recited in claim 2, wherein the first bus has a steady state voltage of 3.3 volts and the second bus has a steady state voltage of 5 volts, and wherein the voltage gap determining circuit provides a voltage gap between the first and second buses of between zero and 1.7 volts.

4. The computer system as recited in claim 2, wherein the voltage gap determining circuit comprises a voltage divider.

5. The computer system as recited in claim 1, wherein the voltage control circuit further comprises:
   a bias circuit which provides a bias voltage to the comparison circuit and the switch.

6. The computer system as recited in claim 5, wherein bias circuit is coupled to the first bus, and wherein the voltage control circuit further comprises a voltage maintenance circuit which maintains operation of the bias circuit for a predetermined time after a removal of power from the first bus.

7. The computer system as recited in claim 1, further comprising another voltage control circuit, which prevents an instantaneous voltage on the first bus from exceeding another instantaneous voltage on the second bus during power removal from the computer system and during a short circuit on the second bus, and which is coupled in parallel to the one voltage control circuit.

8. The computer system as recited in claim 1, wherein the first bus has a steady state voltage of 3.3 volts and the second bus has a steady state voltage of 5 volts.

9. The computer system as recited in claim 1, wherein the switch comprises:
   a field effect transistor having a gate, a source, and a drain, wherein the source is connected to a ground, and wherein the drain is connected to the first bus.

10. The computer system as recited in claim 9, further comprising:
    a bias circuit which provides a bias voltage to the comparison circuit and a drive voltage to the gate of the field effect transistor.

11. The computer system as recited in claim 10, wherein the bias circuit comprises:
    a voltage multiplier for producing the drive voltage, wherein the drive voltage is high enough to drive the field effect transistor into saturation.

12. The computer system as recited in claim 9, wherein the comparison circuit comprises:
    a comparator; and
    a resistance between the comparator and the field effect transistor for limiting capacitive current from the field effect transistor.

13. The computer system as recited in claim 1, wherein the voltage control circuit further comprises:
    a voltage maintenance circuit which maintains operation of the voltage control circuit for a predetermined time after the removal of power from the computer system.

14. A computer system comprising:
    a circuit element powered by both a first steady state voltage and a second steady state voltage different from the first steady state voltage;
    a first bus coupled to the circuit element which provides the first steady state voltage;
    a second bus coupled to the circuit element which provides the second steady state voltage; and
    a voltage control circuit coupled to the first and second buses which prevents damage to the circuit element by preventing an instantaneous voltage on the first bus from exceeding another instantaneous voltage on the second bus during power removal from the computer system and during a short circuit on the second bus, including
    a comparison circuit coupled to the first and second buses which compares the instantaneous voltage on the first bus with the instantaneous voltage on the second bus;
    a switch controlled by the comparison circuit for drawing current from the first bus to reduce the voltage on the first bus to remain below the voltage on the second bus when the voltage on second bus decreases; and
    a voltage gap determining circuit coupled between the second bus and the comparison circuit which provides a reference voltage to the comparison circuit that is a predetermined fraction of the instantaneous voltage on the second bus.

15. A bus voltage control circuit comprising:
    a voltage reducing circuit coupled to a first bus and a second bus which prevents damage to a circuit element coupled to the first and second buses by preventing an instantaneous voltage on the first bus from exceeding another instantaneous voltage on the second bus during power removal from the second bus and during a short circuit on the second bus, wherein the voltage reducing circuit includes a comparison circuit coupled to the first and second buses which compares the instantaneous voltage on the first bus with the instantaneous voltage on the second bus, and a switch controlled by the comparison circuit for draw in current from the first bus to reduce the voltage on the first bus to remain below the voltage on the second bus when the voltage on second bus decreases.

16. The bus voltage control circuit as recited in claim 15, wherein the voltage reducing circuit further comprises:
    a voltage gap determining circuit coupled between the second bus and the comparison circuit which provides a reference voltage to the comparison circuit that is a predetermined fraction of the instantaneous voltage on the second bus.

17. The bus voltage control circuit as recited in claim 16, wherein the voltage gap determining circuit comprises a voltage divider.

18. The bus voltage control circuit as recited in claim 15, wherein the voltage reducing circuit further comprises:
    a bias circuit which provides a bias voltage to the comparison circuit and the switch.

19. The bus voltage control circuit as recited in claim 15, further comprising another voltage reducing circuit, which prevents an instantaneous voltage on the first bus from exceeding another instantaneous voltage on the second bus during power removal from the second bus and during a short circuit on the second bus, and which is coupled in parallel to the one voltage reducing circuit.

20. The bus voltage control circuit as recited in claim 15, wherein the first bus has a steady state voltage of 3.3 volts and the second bus has a steady state voltage of 5 volts.

21. The bus voltage control circuit as recited in claim 15, wherein the switch comprises:
    a field effect transistor having a gate, a source, and a drain, wherein the source is connected to a ground, and wherein the drain is connected to the first bus.

22. The bus voltage control circuit as recited in claim 21, wherein the voltage reducing circuit further comprises:
    a bias circuit which provides a bias voltage to the comparison circuit and a drive voltage to the gate of the field effect transistor.

23. The bus voltage control circuit as recited in claim 22, wherein the bias circuit comprises:

a voltage multiplier for producing the drive voltage, wherein the drive voltage is high enough to drive the field effect transistor into saturation.

24. The bus voltage control circuit as recited in claim 22, wherein bias circuit is coupled to the first bus, and wherein the bus voltage control circuit further comprises a voltage maintenance circuit which maintains operation of the bias circuit for a predetermined time after a removal of power from the first bus.

25. The bus voltage control circuit as recited in claim 21, wherein the comparison circuit comprises:

a comparator; and a resistance between the comparator and the field effect transistor for limiting capacitive current from the field effect transistor.

26. The bus voltage control circuit as recited in claim 15, wherein the voltage gap determining circuit provides a voltage gap between the first and second buses of between zero and 1.7 volts.

27. The bus voltage control circuit as recited in claim 15, wherein the bus voltage control circuit further comprises:

a voltage maintenance circuit which maintains operation of the voltage reducing circuit for a predetermined time after the removal of power.

28. A bus voltage control circuit comprising:

a voltage reducing circuit coupled to a first bus and a second bus, which prevents damage to a circuit element coupled to the first and second buses by preventing an instantaneous voltage on the first bus from exceeding another instantaneous voltage on the second bus during power removal from the second bus and during a short circuit on the second bus, and which includes a comparison circuit coupled to the first and second buses which compares the instantaneous voltage on the first bus with the instantaneous voltage on the second bus;

a switch controlled by the comparison circuit for drawing current from the first bus to reduce the voltage on the first bus to remain below the voltage on the second bus when the voltage on second bus decreases; and a voltage gap determining circuit coupled between the second bus and the comparison circuit which provides a reference voltage to the comparison circuit that is a predetermined fraction of the instantaneous voltage on the second bus.

29. A method for preventing damage to a circuit element coupled to first and second buses caused by an instantaneous voltage on the first bus exceeding another instantaneous voltage on the second bus during power removal from the second bus and during a short circuit on the second bus, comprising the steps of:

(a) comparing the instantaneous voltages on the first and second buses by a comparison circuit coupled to the first and second buses; and (b) if the instantaneous voltage on the first bus is within a predetermined voltage difference of the instantaneous voltage on the second bus, decreasing the instantaneous voltage on the first bus, including the substep of (b-1) providing current flow from the first bus, including the substeps of (b-1-A) providing a switch between the first bus and a ground; and (b-1-B) closing the switch by the comparison circuit.

30. The method as recited in claim 29, wherein substep (b-1-B) comprises the substep of:

(b-1-B-1) keeping the switch closed for a predetermined time after a removal of power on the first bus by the comparison circuit.

31. A method for preventing damage to a circuit element coupled to first and second buses caused by an instantaneous voltage the first bus exceeding another instantaneous voltage the second bus during power removal from the second bus and during a short circuit on the second bus, comprising the steps of:

(a) comparing the instantaneous voltages on the first and second buses by a comparison circuit coupled to the first and second buses; and (b) if the instantaneous voltage on the first bus is within a predetermined voltage difference of the instantaneous voltage on the second bus, decreasing the instantaneous voltage on the first bus including the substeps of (b-1) providing current flow from the first bus, including the substeps of (b-1-A) providing a switch between the first bus and a ground; and (a-3-B) (b-1-B) closing the switch by the comparison circuit.

* * * * *

UNITED STATES PATENT AND TRADEMARK OFFICE
CERTIFICATE OF CORRECTION

PATENT NO. : 5,675,809
DATED : October 7, 1997
INVENTOR(S) : Charles A. Gantt

It is certified that error appears in the above-indentified patent and that said Letters Patent is hereby corrected as shown below:

Column 6, line 31, delete "draw in" and substitute --drawing--.

Signed and Sealed this

Twenty-first Day of March, 2000

Attest:

Attesting Officer

Q. TODD DICKINSON

Commissioner of Patents and Trademarks